United States Patent [19]

Margetts

[11] 4,338,854
[45] Jul. 13, 1982

[54] SERVO BOOSTERS FOR VEHICLE BRAKING SYSTEMS

[75] Inventor: Hugh G. Margetts, Warwickshire, England

[73] Assignee: Lucas Industries Limited, Birmingham, England

[21] Appl. No.: 95,961

[22] Filed: Nov. 20, 1979

[30] Foreign Application Priority Data

Nov. 21, 1978 [GB] United Kingdom ............... 45469/78

[51] Int. Cl.³ .............................................. F15B 9/10
[52] U.S. Cl. ................... 91/369 A; 92/98 D; 92/107; 92/165 PR
[58] Field of Search .................. 92/98 D, 99, 165 PR, 92/166, 107; 91/369 R, 369 A, 369 B

[56] References Cited

U.S. PATENT DOCUMENTS

| 3,057,332 | 10/1962 | Kellogg | 92/98 D |
| 3,083,698 | 4/1963 | Price | 92/99 |
| 3,172,335 | 3/1965 | Brooks | 92/166 |
| 3,387,540 | 6/1968 | Wilson | 91/369 B |
| 3,537,358 | 11/1970 | Bunyard | 92/166 |

FOREIGN PATENT DOCUMENTS 2922299 12/1979 Fed. Rep. of Germany ... 91/369 A

Primary Examiner—Abraham Hershkovitz
Attorney, Agent, or Firm—Scrivener, Clarke Scrivener and Johnson

[57] ABSTRACT

In a servo booster the movable wall is sealed to the rear housing wall by a rolling diaphragm supported on a sleeve which projects forwardly from the rear housing wall, and fluid communication between the rear housing chamber of the booster and a valve chamber in the valve body is provided by inter-communicating passages in the valve body and diaphragm support plate. The passage in the diaphragm support plate terminates in a port opening to the rear booster chamber. In one construction the sleeve is elliptical in transverse cross-section and a pair of tie rods extend right through the booster, through the bore of the sleeve, for relieving the booster housing of braking reaction forces. In another construction, instead of tie rods, the sleeve is extended to provide a tube, arms extend through slots in the tube to connect integrally the diaphragm support plate and the valve body, and one arm contains the passage.

3 Claims, 3 Drawing Figures

SERVO BOOSTERS FOR VEHICLE BRAKING SYSTEMS

SPECIFIC DESCRIPTION

This invention relates to servo boosters for vehicle braking systems of the kind comprising a booster housing, a movable wall dividing the housing into two chambers and comprising a diaphragm support plate which is sealed to the housing at its radially outer periphery by a flexible diaphragm, an output member, a valve body, and means connecting the diaphragm support plate to the valve body, the arrangement being such that the force applied to the movable wall in use by a pressure differential between the chambers is transmitted via the valve body to the output member.

In conventional boosters of this kind the movable wall is sealed at its radially inner extremity to the valve body to isolate the two chambers, and the valve body is provided with a passage which extends substantially radially therethrough to provide permanent fluid communication between the rear chamber, that chamber remote from the output member, and a valve chamber in the valve body.

According to the invention in a servo booster of the kind set forth the movable wall is sealed at its radially inner extremity directly or indirectly to the rear housing wall by a seal means located radially outwards from the valve body, and a valve chamber in the valve body is connected to the rear chamber of the booster by passage means which terminates in a port located in the diaphragm support plate radially outwards of the seal means and opening to the rear chamber.

Preferably the diaphragm support plate is integrally connected to the valve body, and the passage means is formed in the integral assembly.

Preferably the rear wall of the housing is provided with a forwardly extending sleeve located radially outwardly of the valve body, and the seal means effects a seal with the radially outer surface of the sleeve.

The seal means preferably comprises a rolling diaphragm which is preferably integral with said flexible diaphragm, but the seal means may comprise a seal slidably engaging the sleeve.

In the Specification of U.K. Patent Application No. 41321/78 of our subsidiary Girling Limited was described and claimed a servo booster assembly for a vehicle braking system comprising a housing, a movable wall dividing the interior of the housing into two chambers and adapted to apply a force to an output member when the chambers are subjected to a pressure differential in response to a force applied to an input member, at least one stationary force transmitting means extending through the movable wall from the housing wall to a housing wall on the opposite side of the movable wall, and means sealing the movable wall directly or indirectly to the force transmitting means.

The booster of the present invention preferably incorporates a force transmitting means which is stationary with respect to the vehicle in use, which extends through the movable wall from the front housing wall to the rear housing wall, and which is located radially inwards of said seal means.

When the rear housing wall is provided with a forwardly extending sleeve, as previously mentioned, the sleeve may constitute the rear portion of the force transmitting means, or the force transmitting means may comprise one or more ties which extend through the sleeve.

In the Description of our Patent Application Ser. No. 072,326, filed Sept. 4, 1979, we have set forth a servo booster for a vehicle braking system comprising a booster housing having front and rear housing walls for mounting adjacent to a master cylinder housing and a vehicle bulkhead respectively, a pedal-operated input member axially aligned with an output member, a thrust assembly interposed between the input and output members, a movable wall, and a stationary force transmitting means extending between the front and rear housing walls for transmitting in use reaction forces from the master cylinder housing to the vehicle bulkhead, the force transmitting means comprising a tube which is co-axial with the input and output members, the movable wall being located radially outwardly of the tube, and means being provided to transmit forward movement of the movable wall to the thrust assembly. The tube of that booster is preferably provided with at least one aperture, and the means transmitting forward movement of the movable wall to the thrust assembly comprises an arm extending through the aperture, first seal means being arranged to seal the movable wall to the radially outer surface of the tube at a location axially displaced in one direction from said aperture, and second seal means arranged to seal the tube to the appropriate housing wall at a location further axially displaced from said apertures in the same direction.

When the sleeve of a construction in accordance with the present invention constitutes the rear portion of a tubular force transmitting means, the tube may similarly be apertured, and the diaphragm support plate be connected to the valve body by at least one arm extending through the aperture, the passage means then comprising a bore in said arm.

The invention will now be described, by way of example only with reference to the accompanying drawings in which.

Figure 1:
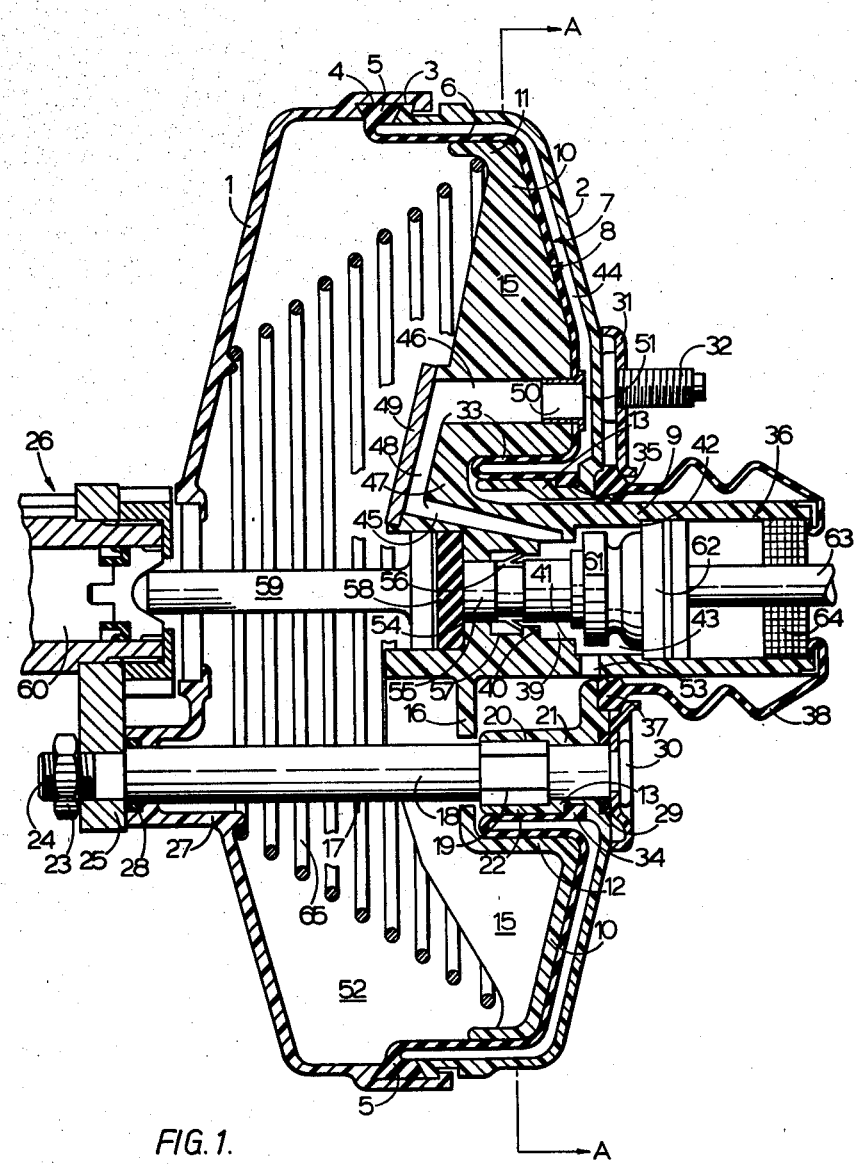
FIG. 1 is a longitudinal cross-section on the line B—B of FIG. 2 of a vacuum-operated servo-booster assembly in accordance with the invention with the parts being shown in their retracted positions, the booster being shown connected to the rear end of an hydraulic master cylinder.
Figure 2:
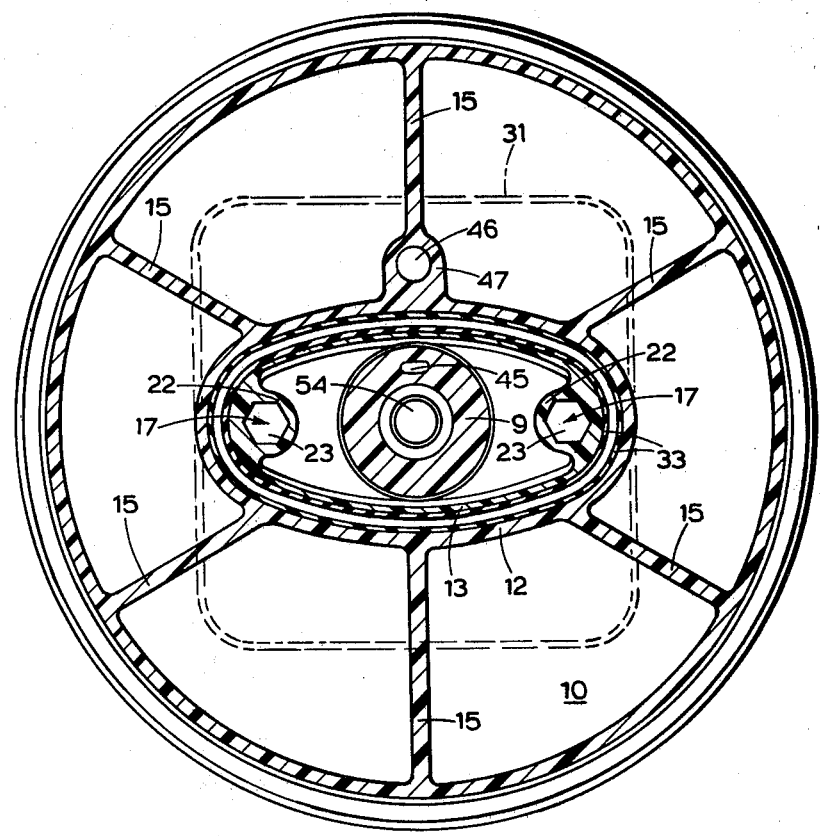
FIG. 2 is a vertical cross-section of the booster on the line A—A of FIG. 1.

The booster of FIGS. 1 and 2 comprises front and rear moulded plastics housing shells 1 and 2 respectively adapted to have a snap-engagement 3 with each other around their radially outer peripheries and so define therebetween a wedgeshaped annular recess 4 in which is retained a peripheral bead 5 of a flexible main diaphragm 6. An axially movable wall 7 comprises main diaphragm 6 and a moulded plastics diaphragm support plate 8 which is integral with a substantially cylindrical valve body 9. Diaphragm support plate 8 comprises a frusto-conical main portion 10 connected at its radially outer periphery to a forwardly extending flange 11 and at its radially inner periphery to the rear end of a first sleeve 12 of elliptical transverse cross-section. Sleeve 12 is uniformly spaced outwardly from a second sleeve 13 of elliptical transverse cross-section, as shown in FIG. 2, the second sleeve 13 being integrally moulded with the rear housing shell 2 and extending forwardly therefrom. The diaphragm support plate 8 is reinforced by radially extending webs 15 of substantially uniform thickness interconnecting the flange 11 and the valve body 9. First sleeve 12 is connected at its front end to the valve body by means of an integral annular elliptical disc 16.

The front and rear housing shells 1 and 2 are connected together in use by means of two stationary force transmitting means in the form of axially extending ties 17 which are symmetrically disposed on a diameter of the booster axis and on the principal ellipse axis of the sleeves 12 and 13. Each tie 17 comprises a stud 18 provided at an intermediate point in its length with a splined portion 19 which is slidably received within an internally splined portion 20 of an axial bore 21 in a respective lug 22 which extends forwardly from rear shell 2 and to which sleeve 13 is tangential. The co-operation between the splined portion 19 and 20 resists turning of the stud 18 when a respective nut 23 is tightened onto a threaded front end 24 to secure the respective stud 18 to a flange plate 25 of an hydraulic master cylinder assembly 26. At its front end each stud 18 is slidably received within the bore of a respective forwardly extending tubular boss 27 on front shell 1, and each stud 18 is sealed to the respective housing shells 1 and 2 by annular seals 28 and 29 respectively. At its rear end each stud 18 is rivetted at 30 to a substantially square pressed metal adaptor plate 31 which carries a pair of diametrically opposed studs 32 for connecting the rear housing shell 2 to a vehicle bulkhead, not shown.

It will be appreciated that the force transmitting means 17 transmit in use reaction forces from the flange 25 of the master cylinder 26 to the vehicle bulkhead to relieve the booster housing of such forces.

The main diaphragm 6 is integral at its radially inner periphery with a rolling diaphragm 33 of elliptical shape in transverse cross-section which is arranged in the space between sleeves 12 and 13 so as to roll from the inner surface of sleeve 12 to the outer surface of sleeve 13 on forward movement of the movable wall 7 relative to the booster housing. The rolling diaphragm portion 33 is permanently sealed to sleeve 13 by a peripheral bead 34 located in an external annular recess 35 at the rear end of sleeve 13.

Valve body 9 is provided with a multi-stepped through bore 36 and is slidably sealed in a central aperture in rear housing shell 2 by an annular seal 37 integral with a flexible concertina boot 38, the seal 36 being held in place by the radially inner periphery of adapter plate 31. A first annular valve chamber 39 is defined in bore 36 between adjacent steps 40 and 41, and a second annular valve chamber 43 is defined between step 41 and a further step 42 located rearwardly of the step 41, the steps 40, 41, and 42 being of progressively increasing diameter in that order. First valve chamber 39 communicates permanently with rear booster chamber 44 by a passage means comprising bores 45 and 46 formed in a substantially L-shaped arm 47 integral with valve body 9 and with the uppermost web 15, and by an elongate recess 48 formed in one end of arm 47 and closed by an elongate plate 49 bonded to arm 47. Arm 47 is preferably of greater thickness than web 15. Main diaphragm 6 is sealed to diaphragm plate 7 around a port 50 at the rear end of bore 46 by a tubular plug 51. Valve chamber 43 communicates directly with front booster chamber 52 by means of a radial port 53 in the wall of valve body 9.

A waisted valve control member 54 is slidable in a portion 55 of bore 36 of least diameter and its retracted position is determined by the engagement of a barbed abutment ring 56 carried on its waist with the rear end of an annular recess 57 in bore 36. At its front end the valve control member 54 engages with an elastomeric reaction disc 58 located behind the head of an output member 59 which engages at its front end with a master cylinder piston 60. The function of reaction disc 58 will be well understood by those skilled in the art.

The step 41 in bore 36 provides one valve seat for co-operation with the annular valve head 61 of an axially flexible poppet valve member 62, and a second valve seat, not shown, is formed on the rear end of valve control member 54 and is also engageable by valve head 61 in well known manner. A pedal-operated input rod 63 extends through an air filter 64 and through poppet valve member 62 to engage the valve control member 54.

In the retracted position of the input rod 63 the parts are as shown in FIG. 1, being biassed to those positions by a coil spring 65, and since valve head 61 is clear of step 41 the two booster chambers 44 and 52 are in communication with one another by way of port 50, bore 46, recess 48, bore 45, chambers 39 and 43, and port 53. A vacuum connection, not shown, in front housing shell 1 connects both chambers to vacuum in this condition. Valve head 61 is engaged with the second valve seat on valve control member 54 to isolate the chambers from atmosphere. On forward movement of rod 63 valve head 61 engages with step 41 to isolate valve chambers 39 and 43 and thus isolate the booster chambers 44 and 52, and on further forward movement of output rod 63 the valve control member with its second seat is removed from valve head 61 to provide communication between valve chamber 39 and atmosphere through filter 64 and thus connect rear chamber 44 to atmosphere and thereby apply a pressure differential to the movable wall 7.

Figure 3:
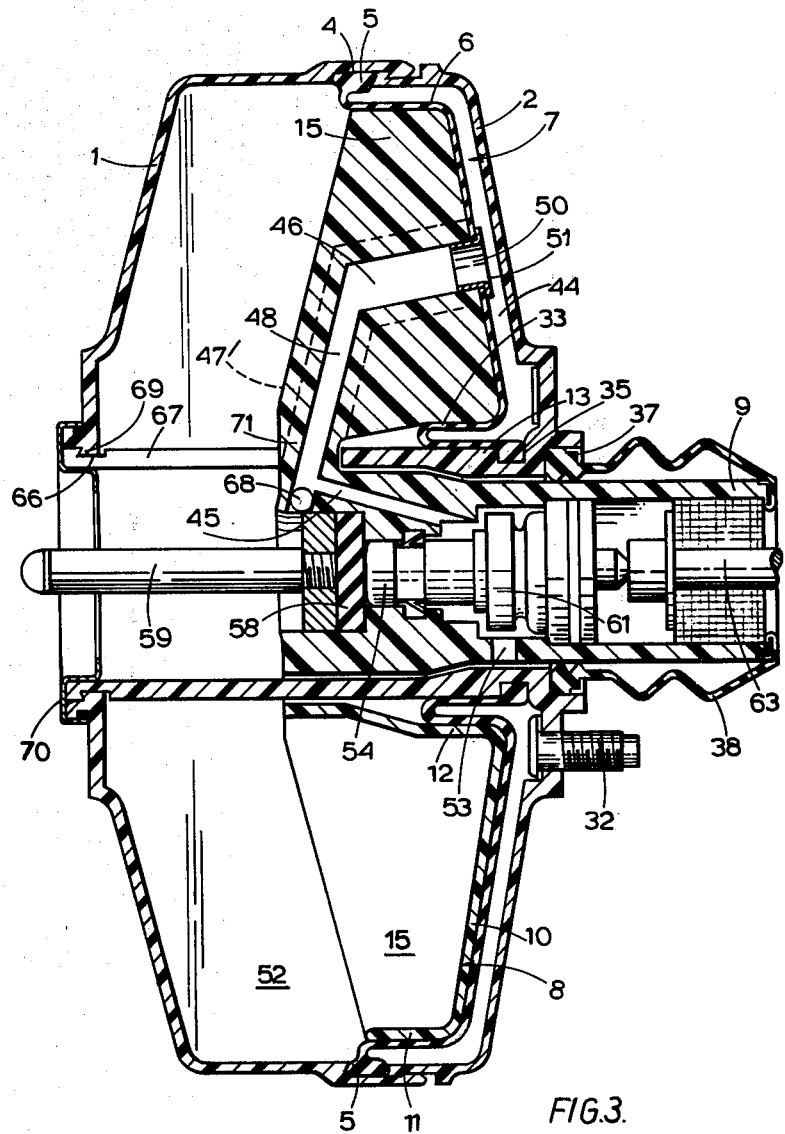
FIG. 3 is a section similar to FIG. 1 but of a second booster in accordance with the invention.

In FIG. 3 parts corresponding to those of the booster of FIG. 1 have been given corresponding reference numerals. The principal difference between the booster of FIG. 3 and that of FIGS. 1 and 2 is that there are no studs equivalent to studs 18, the sleeve 13 in this case being extended forwardly to define a tubular force transmitting means connecting together the central regions of the housing shells 1 and 2. Sleeve 13 has its front half formed with three equi-angularly spaced axially extending slots 67, each of which receives a radial arm 71 integrally connecting the front end of sleeve 12 of diaphragm support plate 8 to the front end of the valve body 9. One of the arms 71, the one shown in FIG. 3, is continuous with an L-shaped arm 47′, indicated in dotted outline, provided with bores 48 and 46, the radially inner open end of bore 48 being closed by a ball 68 after moulding.

The arms defined by the slots 67 in the front half of sleeve 13 are provided at their front ends with external recesses 66 which have a snap engagement with an internal annular bead 69 provided at the radially inner periphery of front shell 1, and the arms are retained secured to shell 1 by an annular metal retaining member 70 of substantially U-shape in transverse cross-section.

It will be realised that the constructions of both FIGS. 1 and 3 employ a minimum of seals to isolate the front and rear booster chambers 44 and 52 whilst accommodating a force transmitting means extending through the movable wall.

I claim:

1. A servo booster for a vehicle braking system comprising a booster housing, output and input members at the front and rear respectively of the booster, front and rear housing walls of said booster housing, a movable wall dividing the interior of said booster housing into front and rear chambers, said movable wall comprising a diaphragm support plate and a flexible diaphragm which seals said movable wall at its radially outer periphery to said booster housing, a valve body, an integral connection connecting said diaphragm support plate to said valve body, force transmitting means comprising a tube which is substantially co-axial with the movable wall and extends forwardly from said rear housing wall in fluid tight relationship therewith, said tube extending to said front housing wall and being stationary with respect to the vehicle in use and arranged substantially to relieve said booster housing of braking reaction forces, seal means fixedly sealing said movable wall at its radially inner extremity to the radially outer surface of said tube, said tube having at least one aperture therein, said integral connection connecting said diaphragm support plate to said valve housing comprising an arm extending through said aperture, a valve member located in said valve body, said valve body being provided with a valve chamber adjacent to said valve member, and a fluid conduit connecting said valve chamber and said rear chamber, said fluid conduit comprising intercommunicating first, second and third passages in said valve body, integral connection and diaphragm support plate, respectively, said first passage of said fluid conduit opening to said valve chamber, and said third passage of said fluid conduit opening to said rear chamber radially outwards of said seal means.

2. A servo booster as claimed in claim 1 wherein said diaphragm support plate is provided with a plurality of integral, radially extending webs for reinforcing said diaphragm support plate, one of said webs being thickened and comprising the arm of the integral connection in which said second passage is located.

3. A servo booster as claimed in claim 1 in which said diaphragm is a rolling diaphragm, said diaphragm having an inner periphery defining said seal means.

* * * * *